US 12,306,811 B1

(12) United States Patent
Liu et al.

(10) Patent No.: US 12,306,811 B1
(45) Date of Patent: May 20, 2025

(54) SYSTEMS AND METHODS FOR IMPROVED PRECISION IN DETECTING FALSE-POSITIVE CHANGEPOINTS IN TIME-SERIES DATA

(71) Applicant: Capital One Services, LLC, McLean, VA (US)

(72) Inventors: Zhengqing Liu, McLean, VA (US); Anupam Shit, Bankura (IN); Abhishek Tewari, Allahabad (IN); Hassan Shallal, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/402,658

(22) Filed: Jan. 2, 2024

(30) Foreign Application Priority Data

Nov. 20, 2023 (IN) .............................. 202341078571

(51) Int. Cl.
*G06F 16/215* (2019.01)
*G06F 16/28* (2019.01)

(52) U.S. Cl.
CPC .......... *G06F 16/215* (2019.01); *G06F 16/287* (2019.01)

(58) Field of Classification Search
CPC ............................ G06F 16/215; G06F 16/287
See application file for complete search history.

(56) References Cited

U.S. PATENT DOCUMENTS 10,671,443 B1 * 6/2020 Ramachandran ....... G06F 9/541
2021/0034994 A1 * 2/2021 Stocker .................... G06N 5/04

* cited by examiner

*Primary Examiner* — Apu M Mofiz
*Assistant Examiner* — Oscar Wehovz
(74) *Attorney, Agent, or Firm* — Foley & Lardner LLP (57) ABSTRACT

The systems and methods for improved precision in detecting false-positive changepoints in time-series data. The system may receive a first dataset of time-series datapoints. The system may determine a first changepoint in the first dataset. The system may determine a first category of known values for the first dataset. The system may, based on the first category of the known values, select a first model from a plurality of models for determining whether the first changepoint corresponds to a first false-positive changepoint. The system may, in response to selecting the first model, process, using the first model, the first changepoint and a first value of the known values to determine a first output. The system may generate for display, in a user interface, a first recommendation based on the first output, wherein the first recommendation indicates whether the first changepoint corresponds to the first false-positive changepoint.

20 Claims, 4 Drawing Sheets

SYSTEMS AND METHODS FOR IMPROVED PRECISION IN DETECTING FALSE-POSITIVE CHANGEPOINTS IN TIME-SERIES DATA

BACKGROUND

A changepoint is a specific point or location in a dataset or time series where there is a noticeable and significant shift or change in the underlying data distribution, behavior, or statistical properties. In other words, a changepoint is a moment where the data transitions from one state or pattern to another. Changepoints can manifest in various ways, including changes in mean, variance, trend, seasonality, or any other structural property of the data. They are often used to identify shifts in patterns, detect anomalies, or mark significant events in time-series or sequential data. Changepoints can be found in data from diverse fields, including quality control, finance, environmental monitoring, epidemiology, signal processing, and more.

Detecting changepoints is technically challenging for several reasons. First, real-world data often contains noise, which is random variation that can obscure the underlying patterns. Noise can make it difficult to distinguish genuine changepoints from fluctuations in the data. Second, it is typically not known in advance how many changepoints exist in the data. Determining the optimal number of changepoints can be a complex problem, and overfitting (detecting too many changepoints) or underfitting (missing changepoints) can occur. Third, data may exhibit various complex structures, high-dimensionality, and/or other complex statistical properties.

Further exacerbating the difficulties in detecting changepoints, changepoints are typically not characterized by abrupt shifts but by more gradual transitions or subtle changes. Identifying these types of changepoints can be challenging and lead to many false-positive determinations.

SUMMARY

Systems and methods are described herein for novel uses and/or improvements to changepoint detection. In particular, systems and methods are described for improved precision in detecting false-positive changepoints in time-series data. To achieve these improvements over conventional systems, the systems and methods detect false-positive changepoints in a dataset using a model that is selected from a plurality of models based on the categories of values in the dataset. For example, balancing sensitivity (the ability to detect true changepoints) and specificity (the ability to avoid false positives) can be challenging as a model may be designed to be more conservative, leading to missed changepoints, or more liberal, resulting in more false positives. By using a plurality of models, each model may use specific assumptions about the data distribution and/or the nature of the changepoints therein corresponding to the categories in the dataset.

Moreover, the systems and methods may use specific models (e.g., corresponding to specific algorithms) that are not traditionally used for changepoint detection, and in particular false positives of changepoints. For example, one model may use consecutive changepoint filtering. Conventional systems would not try to detect consecutive changepoints (or use them to detect false-positive changepoints) because changepoints indicate a change from a first statistically significant segment of a trend to another; however, if there is a consecutive changepoint, there is no segment. As another example, another model may use an F-test (which conventionally uses multiple variables) to detect a false-positive changepoint using one variable (e.g., model performance).

In some aspects, the systems and methods for improved precision in detecting false-positive changepoints in time-series data are described. For example, the system may receive a first dataset of time-series datapoints. The system may determine a first changepoint in the first dataset. The system may determine a first category of known values for the first dataset. The system may, based on the first category of the known values, select a first model from a plurality of models for determining whether the first changepoint corresponds to a first false-positive changepoint. The system may, in response to selecting the first model, process, using the first model, the first changepoint and a first value of the known values to determine a first output. The system may generate for display, in a user interface, a first recommendation based on the first output, wherein the first recommendation indicates whether the first changepoint corresponds to the first false-positive changepoint.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
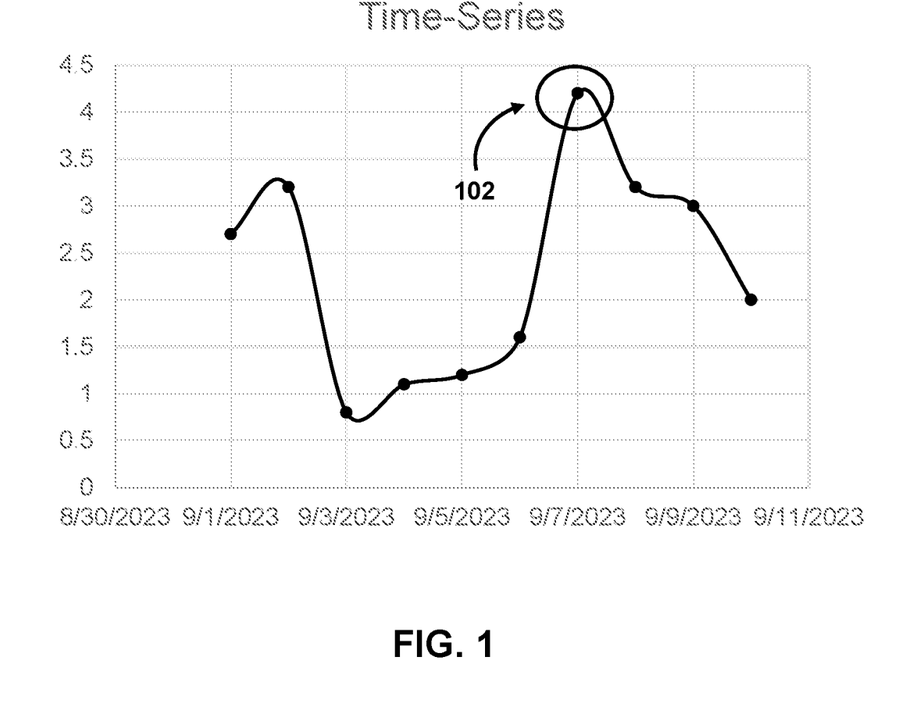
FIG. 1 shows an illustrative diagram for a detected changepoint in time-series data, in accordance with one or more embodiments.

FIG. 1 shows an illustrative diagram for a detected changepoint in time-series data, in accordance with one or more embodiments. For example, changepoint detection, also known as changepoint analysis or structural change detection, is a statistical technique used to identify points or time periods in a dataset where the underlying statistical properties or characteristics change. In other words, it aims to pinpoint the moments when there is a significant shift in the data distribution, such as a change in mean, variance, trend, or some other structural property.

Changepoint detection is employed in various fields and applications, including quality control (e.g., identifying when a manufacturing process experiences a change in product quality or defect rate), finance (e.g., detecting shifts in financial market behavior, such as regime changes in stock prices or volatility), environmental monitoring (e.g., recognizing changes in air quality, temperature, or other environmental variables), epidemiology (e.g., identifying outbreaks or changes in disease patterns), signal processing (e.g., locating changes in signal patterns or noise in time-series data), time-series analysis (e.g., detecting structural breaks in economic time-series data), and/or anomaly detection (e.g., identifying anomalies in data that deviate from normal patterns).

As shown in FIG. 1, a system may detect changepoint 102 using classical statistical approaches and/or machine learning techniques. For example, the system may detect changepoint 102 using CUSUM (cumulative sum) charts. These charts monitor cumulative sums of data and trigger an alarm when the sum exceeds a predefined threshold. Alternatively or additionally, the system may detect changepoint 102 using control charts. These are used in quality control to detect variations in a manufacturing process. Alternatively or additionally, the system may detect changepoint 102 using Bayesian changepoint detection: This approach uses Bayesian methods to estimate the probability of changepoints in a time series. Alternatively or additionally, the system may detect changepoint 102 using window-based techniques. These methods slide a window over the data, comparing statistics inside and outside the window (or segment) to detect changes. Alternatively or additionally, the system may detect changepoint 102 using dynamic programming. Dynamic programming algorithms, such as the Pruned Exact Linear Time (PELT) method, are used to optimize changepoint detection with respect to a cost function. Alternatively or additionally, the system may detect changepoint 102 using machine learning algorithms. For example, supervised machine learning models, like decision trees or support vector machines, can be trained to classify datapoints as either part of a previous regime or a new regime.

In some embodiments, dataset 100 may comprise data used to automate model selection based on dataset fittings of time-series data prior to hyperparameter optimization and/or to otherwise detect trends in data. Additionally or alternatively, a system may use dataset 100 to minimize development time in artificial intelligence models by automating model selection based on dataset fittings of time-series data prior to hyperparameter optimization. As described herein, a model development lifecycle may involve the various stages and processes involved in creating, training, evaluating, deploying, and/or maintaining models. It is a structured framework that helps guide the development of models in a systematic and effective manner.

Fitting a dataset in artificial intelligence models may refer to the process of training a model using available data. Before fitting a dataset, the system may need to preprocess the data to make it suitable for training. This includes tasks such as handling missing values, scaling/normalizing features, encoding categorical variables, and splitting the dataset into training and testing sets. The system may then select an algorithm or model that is appropriate for a task. The choice of the model depends on the type of problem (classification, regression, clustering, etc.) and the characteristics of the data. The system may create an instance of the chosen model and configure its hyperparameters. Hyperparameters control various aspects of the learning process, and the system may need to experiment with different values to achieve optimal performance. The system may then use training data to train (fit) the model. This involves presenting the input features and corresponding target labels (or output) to the model so that it can learn the underlying patterns in the data. During training, the model may use a loss function to measure how well it is performing compared to the actual target values. The optimization algorithm (like stochastic gradient descent) then adjusts the model's parameters (weights and biases) to minimize this loss function. The training process is usually performed in iterations or epochs. In each iteration, the model updates its parameters based on a subset of the training data. This helps the model gradually improve its performance. After each epoch, the system can evaluate the model's performance on a validation set. This helps the system monitor how well the model is generalizing to data it has not seen before.

For example, the system may receive a first dataset, wherein the first dataset comprises one or more categories of data trends. A dataset may comprise a structured collection of datapoints, usually organized into rows and columns, that is used for various purposes, including analysis, research, and training machine learning models. Datasets contain information related to a specific topic, domain, or problem and are used to extract meaningful insights or to train and evaluate algorithms and models. In the context of machine learning, a dataset typically consists of two main components: features and labels. Features (or attributes) are the characteristics or variables that describe each datapoint. Features are represented as columns in a tabular dataset. For example, if the system is working with a dataset of houses, features could include attributes such as the number of bedrooms, square footage, location, etc. Labels, in contrast, may comprise targets and/or responses. For example, in supervised learning tasks, each datapoint often has an associated label that represents the output or target value the system wants the model to predict. For instance, if the system is building a model to predict house prices, the labels would be the actual prices of the houses in the dataset. Datasets come in various formats and sizes, ranging from small tables with a few rows and columns to large and complex databases containing millions of records. They can be generated manually, collected from real-world sources, or obtained from publicly available repositories. Common types of datasets include: structured datasets (e.g., tabular datasets with rows and columns, often stored in formats like CSV (Comma-Separated Values), Excel spreadsheets, or databases); image datasets (e.g., collections of images, often used for computer vision tasks, where each image is treated as a datapoint, and the pixels constitute the features); text datasets (e.g., textual data, such as reviews, articles, or tweets, which can be used for natural language processing (NLP) tasks); time-series datasets (e.g., sequences of datapoints ordered by time, such as stock prices, weather measurements, or sensor readings); and graph datasets (e.g., data organized in a graph structure, with nodes and edges representing relationships between entities). Datasets are fundamental for various data-driven tasks, including exploratory data analysis, statistical analysis, and machine learning model development and evaluation.

Dataset 100 may comprise time-series data. As described herein, "time-series data" may include a sequence of datapoints that occur in successive order over some period of time. In some embodiments, time-series data may be contrasted with cross-sectional data, which captures a point in time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time-series analysis. For example, a time-series analysis may be useful to see how a given asset, security, and/or value related to other content changes over time. It can also be used to examine how the changes associated with the chosen datapoint compare to shifts in other variables over the same time period. For example, with regard to retail loss, the system may receive time-series data for the various sub-segments indicating daily values for theft, product returns, etc.

The time-series analysis may determine various trends such as secular trends, which describe the movement along the term; seasonal variations, which represent seasonal changes; cyclical fluctuations, which correspond to periodic but not seasonal variations; and irregular variations, which are other nonrandom sources of series variations. The system may maintain correlations for this data during modeling. In particular, the system may maintain correlations through non-normalization as normalizing data inherently changes the underlying data, which may render correlations, if any, undetectable and/or lead to the detection of false-positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depend heavily on the normalization choices. Thus, normalization may lead to lower model performance and more model errors. The use of a non-parametric bias test alleviates the need for normalization while still allowing the methods and systems to determine a respective proportion of error detections for each of the plurality of time-series data component models. Through this unconventional arrangement and architecture, the limitations of the conventional systems are overcome. For example, non-parametric bias tests are robust to irregular distributions while providing an allowance for covariate adjustment. Since no distributional assumptions are made, these tests may be applied to data that has been processed under any normalization strategy or not processed under a normalization process at all.

As referred to herein, a "data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time-series data as a data stream. A given increment (or instance) of the time-series data may correspond to a data stream segment.

For example, in some embodiments, the analysis of time-series data presents comparison challenges that are exacerbated by normalization. For example, a comparison of original data from the same period in each year does not completely remove all seasonal effects. Certain holidays such as Easter and Lunar New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2023 and 2024). This comparison ignores the moving holiday effect of Easter. Easter occurs in April for most years but if Easter falls in March, the level of activity can vary greatly for that month for some series. This distorts the original estimates. A comparison of these two months will not reflect the underlying pattern of the data. The comparison also ignores trading day effects. If the two consecutive months of March have different compositions of trading days, it might reflect different levels of activity in original terms even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may, in some cases, be normalized to account for this issue, the normalization of one data stream segment (e.g., for one component model) may affect another data stream segment (e.g., for another component model). Individual normalizations may distort the relationship and correlations between the data, leading to issues and negative performance of a composite data model.

For example, for automated model selection for time-series datasets, it is important to be able to determine whether or not the dataset contains spiky data, as certain time-series models cannot be fit properly to data that exhibits large swings. The system may achieve this by scanning a given dataset for periods of spikiness that are independent of the specific range of the overall dataset and do not use any measure of variance of the data.

For example, the system may receive a time-series dataset. The system may then determine a number of points to check within a sliding window across the dataset, as well as a maximum tolerable percent change with respect to the current range of the data in the sliding window that determines the threshold for calling data spiky (e.g., a "spiky threshold"), and the threshold value may be between 0 and 1.

For this process, the system iterates through the time-series dataset from the beginning, choosing a sliding window of a size of the number (N) of points the user selected. For each sliding window of N points, the system finds the range between the maximum and minimum values in the window. The system then determines the successive differences between each value of the points in the window and divides them by the window's range. If the absolute value of any of these values is greater than the spiky threshold value set by the user, the system exits out of the process and returns the dataset with an indication that it contained spiky data. If it ran to completion without identifying any spiky data, the system exits and returns an indication that it did not identify spiky data at the given parameters.

One type or category of statistical analysis is descriptive statistics. Descriptive statistics summarize and describe the main features of a dataset. This includes measures such as mean, median, mode, standard deviation, variance, and percentiles. Descriptive statistics provide a basic overview of the data's central tendency, variability, and distribution.

Another type of statistical analysis is inferential statistics. Inferential statistics involve making predictions or drawing conclusions about a population based on a sample of data.

Techniques like hypothesis testing, confidence intervals, and regression analysis are used to infer insights about larger datasets. Hypothesis testing is used to make decisions about whether a particular hypothesis about a population is likely true or not. It involves comparing sample data to a null hypothesis and assessing the likelihood of observing the data if the null hypothesis is true.

Another type of statistical analysis is regression analysis. Regression analysis is used to understand the relationship between one or more independent variables (features) and a dependent variable (target). It helps model the relationship and predict the value of the dependent variable based on the values of the independent variables. Another type of statistical analysis is analysis of variance (ANOVA). ANOVA is used to analyze the differences among group means in a dataset. It is often used when there are more than two groups to compare. ANOVA assesses whether the means of different groups are statistically significant. Another type of statistical analysis is a chi-square test. The chi-square test is used to determine whether there is a significant association between categorical variables. It is commonly used to analyze contingency tables and assess whether observed frequencies are significantly different from expected frequencies. Another type of statistical analysis is time-series analysis. Time-series analysis focuses on datapoints collected over time. Techniques like moving averages, exponential smoothing, and autoregressive integrated moving average (ARIMA) models are used to analyze trends, seasonality, and patterns in time-series data. Another type of statistical analysis is cluster analysis. Cluster analysis is used to group similar datapoints together based on their characteristics. It is often used for segmentation and pattern recognition in unsupervised learning tasks.

Another type of statistical analysis is factor analysis. Factor analysis is used to identify patterns of relationships among variables. It aims to reduce the number of variables by grouping them into latent factors that explain the underlying variance in the data. Another type of statistical analysis is principal component analysis (PCA). PCA is a dimensionality reduction technique that transforms high-dimensional data into a lower-dimensional space while retaining as much variance as possible. It is commonly used to reduce noise and extract important features from data.

Figure 2:
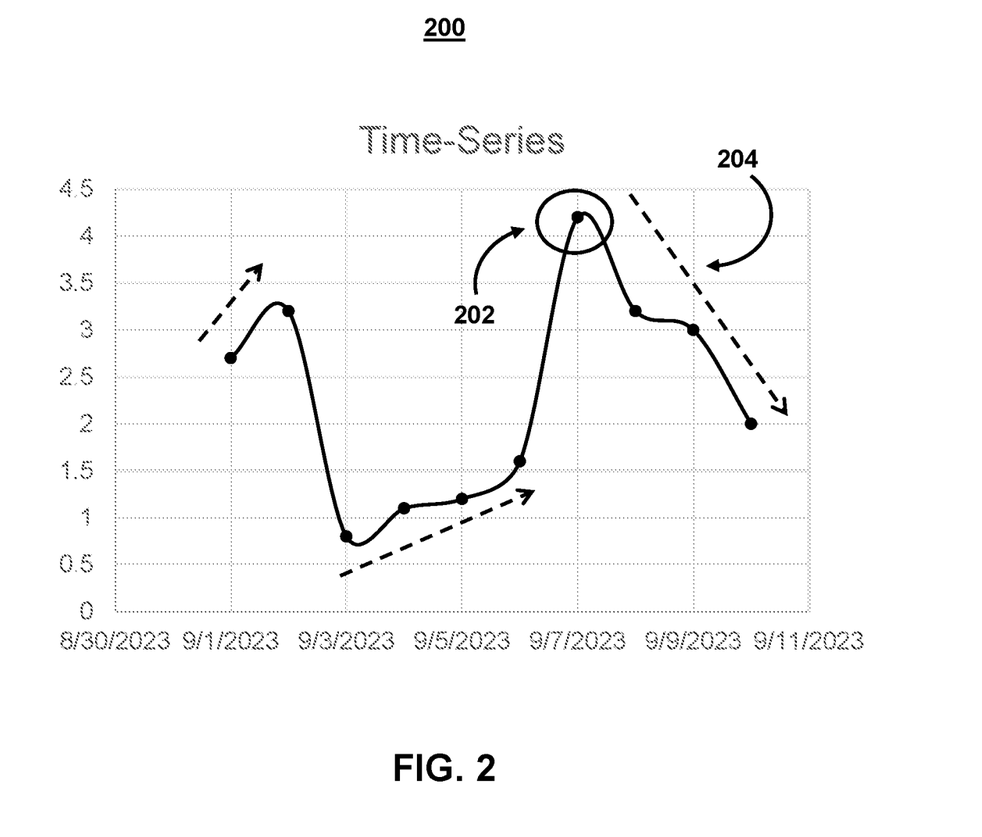
FIG. 2 shows an illustrative diagram for determining whether a detected changepoint is a false-positive changepoint, in accordance with one or more embodiments.

FIG. 2 shows an illustrative diagram for determining whether a detected changepoint is a false-positive changepoint, in accordance with one or more embodiments. For example, FIG. 2 includes dataset 200 (which may correspond to dataset 100 (FIG. 1)). The system may determine whether or not changepoint 202 is a false-positive changepoint based on one or more model outputs based on changepoint 204.

For example, the system may receive a first dataset of time-series datapoints, wherein each datapoint in the time-series datapoints corresponds to a specific time stamp. A dataset may be a structured collection of data, typically organized into rows and columns, that is used for various purposes such as analysis, research, and machine learning. Datasets are fundamental to data science and other data-driven disciplines as they provide the raw information that can be analyzed, processed, and utilized to derive insights, make predictions, or answer research questions. For example, time-series data is a type of data that is collected, recorded, or measured over a series of equally spaced time intervals. In time-series data, each datapoint is associated with a specific time stamp, allowing for the analysis of how a particular variable or phenomenon changes over time. Time-series data is commonly used in various fields, including economics, finance, weather forecasting, stock market analysis, sales forecasting, and many other domains where understanding how data evolves over time is important. Time-series analysis involves various techniques for exploring and modeling these patterns and extracting meaningful insights from the data. These techniques can include statistical methods, forecasting models, and machine learning approaches. Time-series data analysis is widely used for making predictions, identifying anomalies, and understanding historical trends in various domains.

Key characteristics (or categories) of datasets may include whether the dataset has a structured format. Datasets are organized in a structured format, often resembling a table or matrix, with rows representing individual datapoints or observations and columns representing attributes, variables, or features. This structure makes it easier to work with and analyze the data.

Another characteristic (or category) of datasets may include whether the dataset has a particular data type. Datasets can contain various types of data, including numerical data (e.g., age, temperature), categorical data (e.g., color, city names), text data (e.g., comments, descriptions), and more. Another characteristic (or category) of datasets may include whether the dataset has a particular size. Datasets can vary significantly in size, from small datasets containing a few records to large datasets with millions or even billions of records. Another characteristic (or category) of datasets may include whether the dataset has a particular purpose. Datasets are created and collected for specific purposes, such as research, analysis, training machine learning models, or testing algorithms. The choice of data and its collection methods depend on the goals of the project. Another characteristic (or category) of datasets may include whether the dataset has a particular source. Datasets can be obtained from a wide range of sources, including experiments, surveys, sensors, databases, websites, public repositories, and more. Another characteristic (or category) of datasets may include whether the dataset has particular metadata. Datasets often come with metadata, which provides information about the dataset's origin, structure, variables, and any specific details required for its proper use and interpretation.

The system may generate for display, in a user interface, a first changepoint (e.g., changepoint 204) detected in the first dataset, wherein the first changepoint comprises a first datapoint in a first segment of the time-series datapoints that comprises a different data distribution than a second segment of the time-series datapoints. A changepoint in time-series data may refer to a specific point or period in the data where a noticeable and often significant change or discontinuity occurs. This change can manifest as a shift in the underlying data distribution, a sudden increase or decrease in values, or the emergence of a new pattern. Changepoints are essential in time-series analysis because they can indicate shifts in the underlying dynamics of the data, which may have practical implications in various fields. Detecting changepoints in time-series data is an important task in various applications, including anomaly detection, quality control, and financial analysis. Several methods and algorithms are available for changepoint detection, including statistical tests, sequential analysis, and machine learning techniques. These methods aim to identify the location and type of changepoints, helping analysts and researchers understand shifts in the data and potentially take appropriate actions in response to these changes.

The system may receive, via the user interface, a first user input of a first category of known values for the first dataset and/or a second user input of a second category of the first changepoint. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user-generated content may include content created and/or consumed by a user. For example, user-generated content may include content created by another but consumed and/or published by the user.

Time-series data can be categorized into several different types based on the nature of the data and what it represents. Each category of time-series data may require different analytical techniques and methods to extract meaningful insights or make predictions, depending on the characteristics of the data and the specific goals of the analysis. In some embodiments, a known category of time-series data may be whether the dataset comprises a univariate time series: This category consists of a single variable recorded over time. For example, tracking the daily closing price of a single stock is a univariate time series.

In some embodiments, a known category of time-series data may be whether the dataset comprises a multivariate time series: In this type of data, multiple variables are recorded over the same time intervals. Multivariate time series can be used to analyze the relationships and interactions between different variables. For instance, the system might have a multivariate time series that include data on both temperature and humidity recorded at the same time intervals.

In some embodiments, a known category of time-series data may be whether the dataset comprises a longitudinal time series. Longitudinal time series can be used in medical and social sciences to track individual subjects or entities over time. These data can help researchers understand how individuals change or respond to interventions or treatments.

In some embodiments, a known category of time-series data may be whether the dataset comprises a panel time series. Panel time series combine elements of cross-sectional data and time-series data. They involve multiple entities (cross-sectional units), such as companies or regions, observed over time. Panel data can be used for studying how different entities evolve over time and how they may affect one another.

In some embodiments, a known category of time-series data may be whether the dataset comprises a functional time series. In functional time series, the data is treated as a function of time. This means that at each time point, the system may have a function that describes the variable's behavior over time. This is used in fields like functional data analysis and can be particularly useful for capturing complex temporal behaviors.

In some embodiments, a known category of time-series data may be whether the dataset comprises an event time series. This type of time series focuses on specific events or occurrences recorded over time. For example, event time series could track occurrences of website outages, customer complaints, or product defects.

In some embodiments, a known category of time-series data may be whether the dataset comprises a seasonal time series. Seasonal time series data exhibits regular and repeating patterns over time. These patterns, which are known as seasonality, can be daily, weekly, monthly, or follow some other periodic cycle.

In some embodiments, a known category of time-series data may be whether the dataset comprises a non-seasonal time series. Non-seasonal time-series data does not exhibit regular patterns or seasonality. The data may show trends, cycles, or irregular fluctuations without specific repeating patterns.

Changepoints can be categorized into various categories. The system may select a model based on this category. In some embodiments, a changepoint may comprise an abrupt changepoint. This type of changepoint represents an immediate and significant change in the data. For example, if the system is analyzing daily stock prices, an abrupt changepoint might occur when a major news event causes the stock price to plummet or soar suddenly.

In some embodiments, a changepoint may comprise a gradual changepoint. Gradual changepoints involve a slower transition in the data. For instance, a gradual changepoint in a temperature time series might mark the transition from summer to winter.

In some embodiments, a changepoint may comprise an intermittent changepoint. In some cases, changepoints can be intermittent, meaning that changes occur sporadically rather than consistently. These might represent irregular occurrences or events that impact the data.

Based on the first category and/or the second category, the system may select a first model from a plurality of models for determining whether the first changepoint corresponds to a first false-positive changepoint, wherein each model of the plurality of models comprises a different algorithm for detecting false-positive changepoints. The time-series data may include numerous categories of known values, which may be based on one or more characteristics of the time-series data. In some embodiments, a characteristic may be related to a temporal order. The datapoints in a time series are arranged in chronological order, with each point associated with a specific time or date.

In some embodiments, a characteristic may be related to an interval spacing. In most cases, the time intervals between datapoints are uniform and regular, such as daily, hourly, monthly, or yearly intervals. However, irregular time series with unevenly spaced datapoints can also occur.

In some embodiments, a characteristic may be related to a trend and/or pattern. For example, time-series data may exhibit various patterns and trends, including seasonality (recurring patterns within a year), cyclicality (longer-term repeating patterns), and/or overall trend (a general direction in the data).

In some embodiments, a characteristic may relate to noise. For example, time-series data may contain random fluctuations or noise, making it important to distinguish between actual patterns and random variations.

In response to selecting the first model, the system may process, using the first model, the first changepoint and a value of the known values to determine a first output. The system may generate for display, in a user interface, a first recommendation based on the first output, wherein the first recommendation indicates whether the first changepoint corresponds to the first false-positive changepoint. In some embodiments, a model may comprise artificial intelligence, including, but not limited to, machine learning, deep learning, etc. (referred to collectively herein as "artificial intelligence models," "machine learning models," or simply "models").

A recommendation in a user interface may refer to a suggestion or guidance provided to a user, often in the form of content, products, services, or actions, based on their preferences, behavior, or historical interactions within the system. Recommendations may be used in various applications and platforms to enhance user experience, help users discover relevant information, and increase user engagement. Recommendations may be a fundamental component in many websites, apps, and software systems, including e-commerce sites, social media platforms, and/or streaming services.

Figure 3:
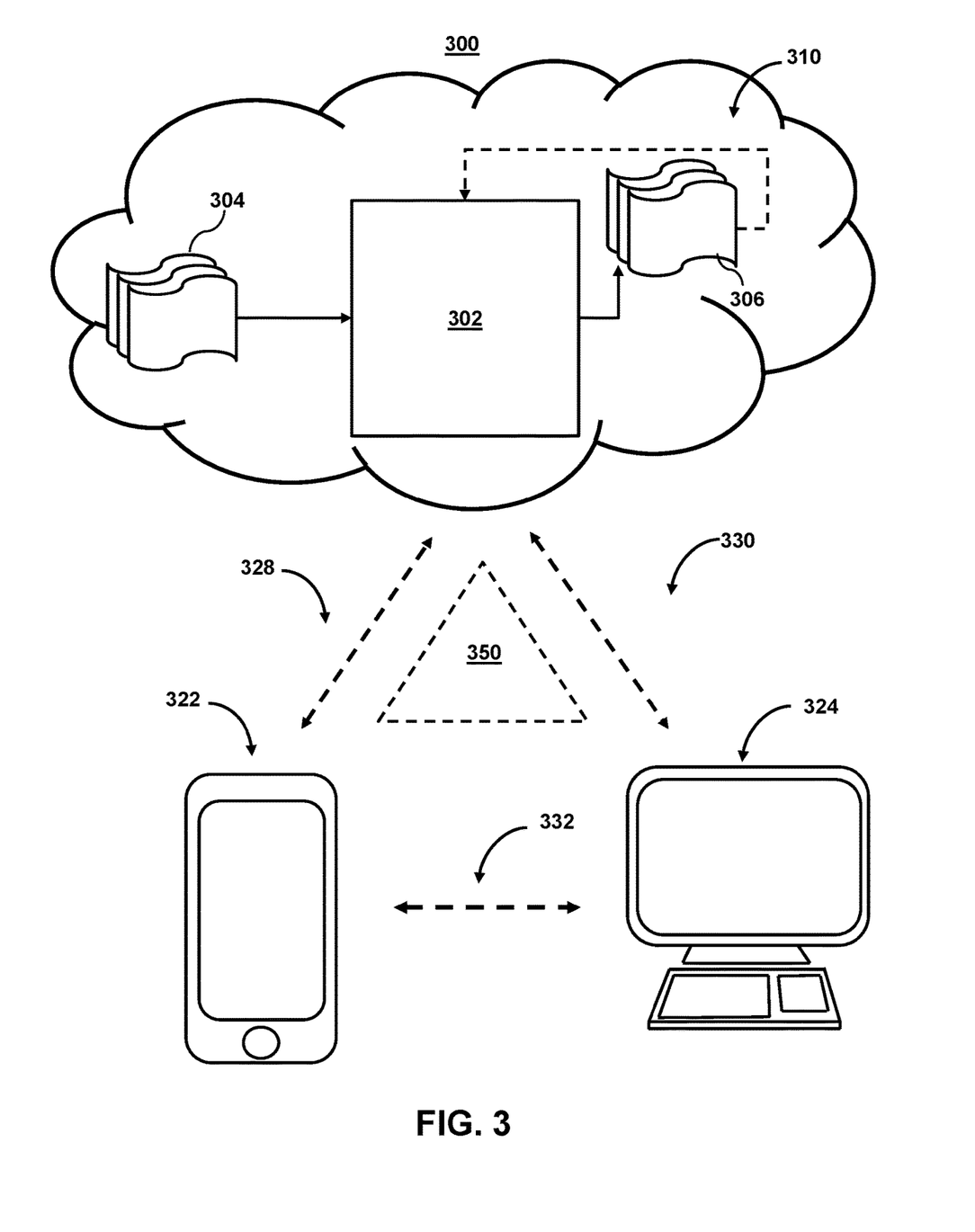
FIG. 3 shows illustrative components for a system used to detect false-positive changepoints, in accordance with one or more embodiments.

FIG. 3 shows illustrative components for a system used to detect false-positive changepoints, in accordance with one or more embodiments. For example, FIG. 3 may show illustrative components for improved precision in detecting false-positive changepoints in time-series data. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a detected changepoint, a false-positive changepoint, a model selection, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a detected changepoint, a false-positive changepoint, a model selection, etc.).

In some embodiments, the model (e.g., model 302) may automatically perform actions based on outputs 306. In some embodiments, the model (e.g., model 302) may not perform any actions. The output of the model (e.g., model 302) may be used to improve precision in detecting false-positive changepoints in time-series data.

System 300 also includes API (Application Programming Interface) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 300 may be partially based on API layer 350 such that there is strong adoption of SOAP and RESTful web services, using resources like Service Repository and Developer Portal, but with low governance, standardization, and separation of concerns. Alternatively, system 300 may be fully based on API layer 350 such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
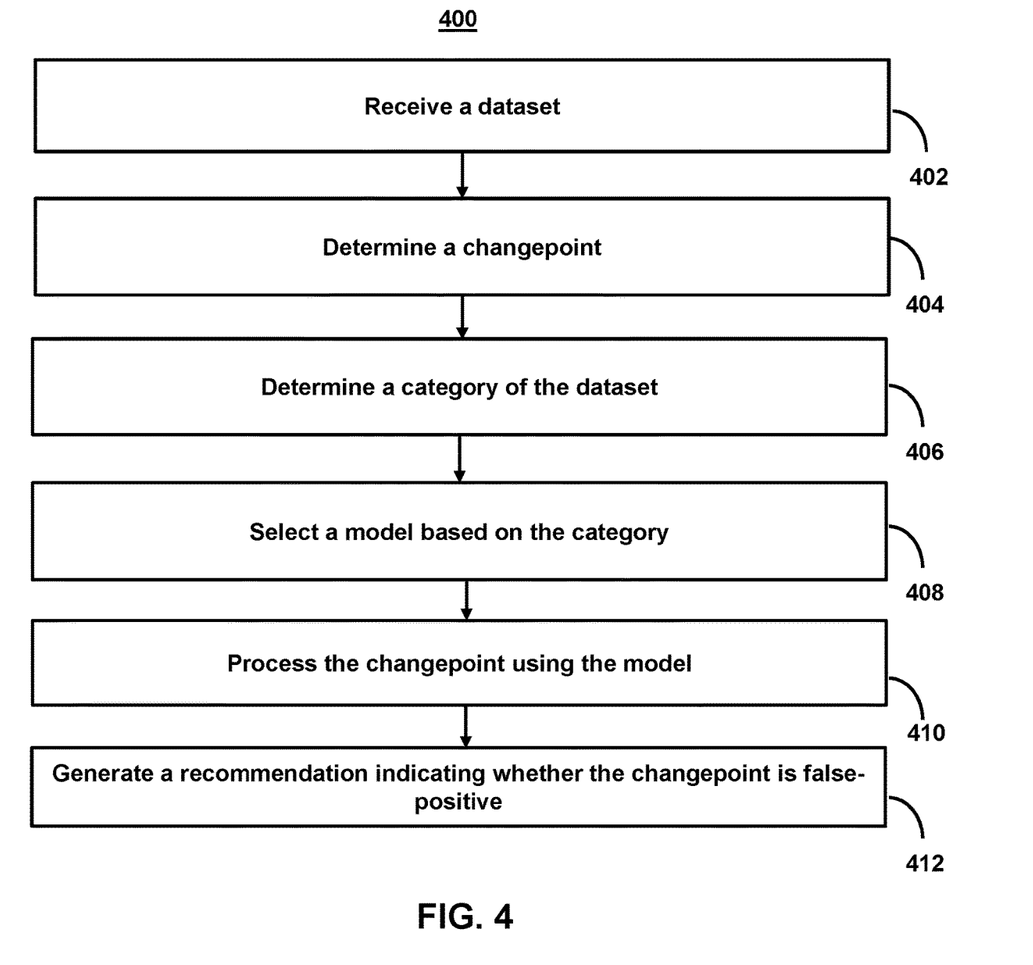
FIG. 4 shows a flowchart of the steps involved in detecting false-positive changepoints in time-series data, in accordance with one or more embodiments.

FIG. 4 shows a flowchart of the steps involved in detecting false-positive changepoints in time-series data, in accordance with one or more embodiments. For example, the system may use process 400 (e.g., as implemented on one or more system components described above) in order to determine whether or not a detected changepoint is a "true" changepoint.

At step 402, process 400 (e.g., using one or more components described above) receives a dataset. For example, the system may receive a first dataset of time-series datapoints. In some embodiments, before a model can receive a dataset, the data must be acquired from a source. Data sources can vary and may include databases, files, APIs, or real-time sensor data. The data may be collected from various sources and in different formats. The acquired data may be collected by the system and stored in a format suitable for further processing. This may involve the system structuring the data into tables, arrays, or other data structures, depending on the model's requirements. In some embodiments, the raw data may require preprocessing to clean and prepare it for modeling. Data preprocessing may include tasks like data cleaning (removing outliers or missing values), normalization, and feature engineering (creating new features from existing ones). If the dataset comes from multiple sources or in different formats, the system may need to be integrated or merged into a single dataset. The model may need to load the dataset into memory or storage that is accessible by the computer's memory. This typically involves reading data from files or databases into data structures like arrays or dataframes. The model may implement methods or functions to access the dataset. The dataset may be loaded in its entirety or accessed in chunks, depending on the size of the data and the model's requirements.

At step 404, process 400 (e.g., using one or more components described above) determines a changepoint. For example, the system may determine a first changepoint in the first dataset. The system may use one or more models for changepoint detection, including statistical tests, sequential analysis, and machine learning techniques. These models may identify the location and type of changepoints.

At step 406, process 400 (e.g., using one or more components described above) determines a category of the dataset. For example, the system may determine a first category of known values for the first dataset. The time-series data may include numerous categories of known values, which may be based on one or more characteristics of the time-series data. In some embodiments, a characteristic may be related to a temporal order. The datapoints in a time series are arranged in chronological order, with each point associated with a specific time or date. In some embodiments, a characteristic may be related to an interval spacing. In most cases, the time intervals between datapoints are uniform and regular, such as daily, hourly, monthly, or yearly intervals. However, irregular time series with unevenly spaced datapoints can also occur. In some embodiments, a characteristic may be related to a trend and/or pattern. For example, time-series data may exhibit various patterns and trends, including seasonality (recurring patterns within a year), cyclicality (longer-term repeating patterns), and/or overall trend (a general direction in the data). In some embodiments, a characteristic may relate to noise. For example, time-series data may contain random fluctuations or noise, making it important to distinguish between actual patterns and random variations.

At step 408, process 400 (e.g., using one or more components described above) selects a model based on the category. For example, the system may, based on the first category of the known values, select a first model from a plurality of models for determining whether the first changepoint corresponds to a first false-positive changepoint. For example, selecting the most appropriate model from a plurality of models is a crucial step. The goal is to choose the model that is most likely to perform well on a specific task or problem. The system may identify a set of potential candidate models to consider. This set may include a variety of algorithms and model architectures that are suitable for the problem at hand. The choice of candidate models depends on the problem type (e.g., regression, classification, clustering) and the nature of the data (e.g., structured data, text, images). In particular, the system may determine a category of known values that may be used to select the model. For example, the system may extract and select relevant features from the dataset. In some embodiments, the system may preprocess and prepare the data. This includes cleaning, handling missing values, encoding categorical variables, and scaling or normalizing features to ensure that the data is in a format suitable for model training and evaluation.

At step 410, process 400 (e.g., using one or more components described above) processes the changepoint using the model. For example, the system may, in response to selecting the first model, process, using the first model, the first changepoint and a first value of the known values to determine a first output. In some embodiments, depending on the model's design and requirements, the dataset may be input into the model for processing. The model may utilize the data for various tasks, such as training (for machine learning models), analysis, or simulations.

In some embodiments, the model may require iterative processing, where the data is processed in multiple rounds or epochs. In machine learning, for example, training a model often involves multiple iterations over the dataset. In some cases, the dataset may need to be updated regularly, especially if the model is used in real-time systems. Updates can be done through automated processes or manual data refresh. Depending on the model's purpose, it may generate outputs or predictions based on the dataset. These outputs can be used for decision-making, visualization, reporting, or any other relevant tasks.

In some embodiments, the system may process, using the first model, the first changepoint and the first value of the known values to determine the first output by determining consecutive changepoints in the first dataset. The system may filter the consecutive changepoints from the first dataset. The system may determine whether the first changepoint is the first false-positive changepoint based on whether the first changepoint is filtered from the first dataset. For example, the system may detect cases of consecutive observations labeled as changepoints and output and clean them with user-specified strategies (e.g., remove both or one of consecutive changepoints) to generate a cleaner output for consumption.

In some embodiments, the system may process, using the first model, the first changepoint and the first value of the known values to determine the first output by generating a feature input based on the first changepoint and the first value. The system may input the feature input into an artificial intelligence model to generate the first output, wherein the artificial intelligence model is trained on historic changepoints in historic datasets. Training an artificial intelligence model to detect changepoints in historic datasets may involve machine learning and statistical techniques. For example, the system may collect a historical dataset that contains data where changepoints are expected to occur. This dataset may include time-series or sequential data relevant to the application, such as sensor readings, financial data, or any data that exhibits change over time. The system may preprocess the data, which may involve cleaning, removing outliers, and normalizing the data to make it suitable for training. The system may identify the locations of true changepoints in the historical dataset. This can be done manually by domain experts or through automated methods if the ground truth is available. The true changepoints serve as the labels for the training data. The system may extract relevant features from the data that can be used by the model for changepoint detection. These features may include statistical measures, time-based characteristics, or domain-specific indicators. The system may split the historical dataset into training and validation sets. The training set is used to train the model, while the validation set is used to evaluate the model's performance. The system may choose an appropriate machine learning or statistical model for changepoint detection. Common methods include Bayesian changepoint detection, Gaussian mixture models, or recurrent neural networks (RNNs), among others. The system may train the selected model using the training dataset. During training, the model learns to identify patterns in the data that correspond to changepoints. The training process involves optimizing model parameters to minimize the error between the predicted changepoints and the actual changepoints in the training data. The system may assess the model's performance on the validation dataset. This step helps determine how well the model generalizes to unseen data. Common evaluation metrics include precision, recall, F1-score, and area under the curve (AUC). The system may adjust the model's hyperparameters, such as learning rate, network architecture, and regularization, to improve its performance on the validation dataset. The system may, if the initial model does not perform well, try different models or more complex architectures or iterate through the training, validation, and hyperparameter tuning steps to improve model performance. The system may, once a satisfactory model is obtained, deploy in a production environment for real-time or batch processing. Testing on new data ensures that the model continues to perform well.

In some embodiments, the system may identify false positives by determining whether consecutive datapoints in the time-series datapoints are identified as changepoints. For example, a changepoint should reflect relatively long-term change in the pattern of data. Therefore, the system may detect consecutive observations as changepoints to be misleading and meaningless to the users. For example, the first category of known values may correspond to known changepoints, and the first value corresponds to an indication of whether a second datapoint is a known changepoint. The system may process, using the first model, the first changepoint and the first value of the known values to determine the first output. The system may then determine whether the second datapoint in the time-series datapoints is the known changepoint. The system may then, in response to determining that the second datapoint in the time-series datapoints is the known changepoint, determine whether the first datapoint and the second datapoint are consecutive datapoints in the time-series datapoints.

In some embodiments, the first category of known values may correspond to a known model performance, and the first value may correspond to a model performance with the first datapoint. The system may process, using the first model, the first changepoint and the first value of the known values to determine the first output by comparing the first value to a threshold value. The system may determine whether the first changepoint is the first false-positive changepoint based on comparing the first model performance to the threshold model performance.

In some embodiments, the system may compare the first model performance to the threshold model performance by determining a second value, wherein the second value corresponds to the model performance without the first datapoint. The system may determine the threshold value based on the second value. For example, the system may flag changepoints that have very small magnitude or very short duration of trend change. Those changepoints can be called insignificant. The system may use a statistical approach leveraging a hypothesis test called F-test to identify such changepoints. The test may compare the model errors with and without the presence of a changepoint. If the difference is statistically small (e.g., under a significance (e.g., threshold) level), the system can conclude that the changepoint has no major significance in an effect on the output. The system may then determine that such insignificant changepoints can be dropped.

In some embodiments, the first category of known values corresponds to known changes in value of model performance, and the first value corresponds to a known change in a model performance when the first datapoint is included. The system may process, using the first model, the first changepoint and the first value of the known values to determine the first output by comparing the first value to a threshold model performance and determining whether the first changepoint is the first false-positive changepoint based on comparing the first model performance to the threshold model performance.

In some embodiments, the model may determine a false-positive changepoint based on a mean and/or slope in a changepoint. For example, the system may quantify the significance of changepoints based on the trend change caused. The system may measure the trend change by looking into mean and slope of the observations before and after the changepoint. This method filters changepoints with user-provided cutoffs on mean and slope change. For example, the first category of known values may correspond to known slopes in the first dataset, and the first value corresponds to a known slope of the first datapoint. The system may process, using the first model, the first changepoint and the first value of the known values to determine the first output by comparing the first value to a threshold slope. The system may determine whether the first changepoint is the first false-positive changepoint based on comparing the first value to the threshold slope.

In some embodiments, the system may determine a false-positive changepoint based on a difference in values of slopes between segments in the dataset. For example, the first category of known values may correspond to known slopes in segments of the first dataset, and the first value corresponds to a known slope of a segment of the first dataset comprising the first datapoint. The system may process, using the first model, the first changepoint and the first value of the known values to determine the first output by determining a difference between the first value and a second value, wherein the second value corresponds to a slope of a consecutive segment in the first dataset. The system may determine whether the first changepoint is the first false-positive changepoint based on the difference.

In some embodiments, the system may normalize a detected difference. For example, the system may determine "n" changepoints that divide the entire time series into "n+1" regimes. The system may compute the mean and/or slope change between two neighboring regimes and divide by the presence of a changepoint. The system may apply normalization so that a generalizable cutoff could be defined by the user across multiple series.

At step 412, process 400 (e.g., using one or more components described above) generates a recommendation indicating whether the changepoint is a false positive. For example, the system may generate for display, in a user interface, a first recommendation based on the first output, wherein the first recommendation indicates whether the first changepoint corresponds to the first false-positive changepoint. In some embodiments, the system may generate a recommendation. A recommendation may comprise suggestion or advice provided by a computer program or system to assist a user in making a decision or selecting an option. These recommendations may be based on outputs of the model, algorithms, and/or data analysis.

In some embodiments, the system may use various methods for indicating whether the first changepoint corresponds to a false-positive changepoint. For example, the recommendation may distinguish between a "true" changepoint and a "false-positive". A "truc" changepoint may represent a genuine change in the underlying data, while a "false positive" may occur when a change is detected even though there is no real change. The indication of whether the first changepoint corresponds to a false positive may comprise a visual inspection, statistical tests, cross-validation techniques, sequential testing, and/or manual review. For example, a changepoint that corresponds to a false positive often appears as a sudden and unexpected jump in the data, which is not in line with the overall data pattern. Visualizing the data and the location of the changepoint can help identify such cases. Statistical tests can be applied to assess the likelihood of a changepoint being a false positive. Common statistical tests for changepoint detection include the CUSUM (cumulative sum) test, likelihood ratio tests, and Bayesian methods. These tests evaluate the evidence for a change by comparing the likelihood of data given a change with the likelihood of data without a change. A changepoint with a low p-value in these tests is more likely to be a true changepoint. Cross-validation techniques can help evaluate the performance of a changepoint detection algorithm. By splitting the data into training and testing sets, the system can assess whether the detected changepoints generalize well to new data. A false-positive changepoint is less likely to be consistent across different data splits. Sequential testing techniques involve monitoring the data as it arrives and identifying changepoints as they occur. This method allows for the detection of a changepoint in real time and can be useful for identifying and confirming true changepoints while ignoring temporary fluctuations. Finally, a domain expert can assess whether the detected changepoint makes sense in the context of the data and the underlying process being studied.

In some embodiments, the system may use multiple models to determine a false-positive changepoint. For example, the system may determine a second category of known values for the first dataset. The system may, based on the second category of the known values, select a second model from the plurality of models for determining whether the first changepoint corresponds to the first false-positive changepoint. The system may, in response to selecting the first model, process, using the second model, the first changepoint and a second value of the known values to determine a second output. The system may generate for display, in the user interface, a second recommendation based on the second output, wherein the second recommendation indicates whether the first changepoint corresponds to the first false-positive changepoint.

In some embodiments, when using multiple models, the system may apply weights to a given output. For example, the system may select a first weight for the first category of known values. The system may weight the first output, based on the first weight, to generate a weighted first output. The system may average the weighted first output and the second output to determine the second recommendation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for improved precision in detecting false-positive changepoints in time-series data.

2. The method of the preceding embodiment, the method comprising: receiving a first dataset of time-series datapoints; determining a first changepoint in the first dataset; determining a first category of known values for the first dataset; based on the first category of the known values, selecting a first model from a plurality of models for determining whether the first changepoint corresponds to a first false-positive changepoint; in response to selecting the first model, processing, using the first model, the first changepoint and a first value of the known values to determine a first output; and generating for display, in a user interface, a first recommendation based on the first output, wherein the first recommendation indicates whether the first changepoint corresponds to the first false-positive changepoint.

3. The method of any one of the preceding embodiments, wherein the first category of known values corresponds to known changepoints, wherein the first value corresponds to an indication of whether a second datapoint is a known changepoint, and wherein processing, using the first model, the first changepoint and the first value of the known values to determine the first output further comprises: determining whether the second datapoint in the time-series datapoints is the known changepoint; and in response to determining that the second datapoint in the time-series datapoints is the known changepoint, determining whether the first datapoint and the second datapoint are consecutive datapoints in the time-series datapoints.

4. The method of any one of the preceding embodiments, wherein the first category of known values corresponds to a known segment of the first dataset, wherein the first value corresponds to a known data distribution of the known segment, and wherein processing, using the first model, the first changepoint and the first value of the known values to determine the first output further comprises: determining whether the known data distribution indicates that the known segment comprises a second changepoint; and in response to determining whether the known data distribution indicates that the known segment comprises the second changepoint, determining whether a first segment comprising the first datapoint is consecutive with the second segment.

5. The method of any one of the preceding embodiments, wherein processing, using the first model, the first changepoint and the first value of the known values to determine the first output further comprises: determining consecutive changepoints in the first dataset; filtering the consecutive changepoints from the first dataset; and determining whether the first changepoint is the first false-positive changepoint based on whether the first changepoint is filtered from the first dataset.

6. The method of any one of the preceding embodiments, wherein the first category of known values corresponds to a known model performance, wherein the first value corresponds to a model performance with the first datapoint, and wherein processing, using the first model, the first changepoint and the first value of the known values to determine the first output further comprises: comparing the first value to a threshold value; and determining whether the first changepoint is the first false-positive changepoint based on comparing the first model performance to the threshold model performance.

7. The method of any one of the preceding embodiments, wherein comparing the first model performance to the threshold model performance further comprises: determining a second value, wherein the second value corresponds to the model performance without the first datapoint; and determining the threshold value based on the second value.

8. The method of any one of the preceding embodiments, wherein the first category of known values corresponds to known changes in value of model performance, wherein the first value corresponds to a known change in a model performance when the first datapoint is included, and wherein processing, using the first model, the first changepoint and the first value of the known values to determine the first output further comprises: comparing the first value to a threshold model performance; and determining whether the first changepoint is the first false-positive changepoint based on comparing the first model performance to the threshold model performance.

9. The method of any one of the preceding embodiments, wherein processing, using the first model, the first changepoint and the first value of the known values to determine the first output further comprises: generating a feature input based on the first changepoint and the first value; and inputting the feature input into an artificial intelligence model to generate the first output, wherein the artificial intelligence model is trained on historic changepoints in historic datasets.

10. The method of any one of the preceding embodiments, further comprising: determining a second category of known values for the first dataset; based on the second category of the known values, selecting a second model from the plurality of models for determining whether the first changepoint corresponds to the first false-positive changepoint; in response to selecting the first model, processing, using the second model, the first changepoint and a second value of the known values to determine a second output; and generating for display, in the user interface, a second recommendation based on the second output, wherein the second recommendation indicates whether the first changepoint corresponds to the first false-positive changepoint.

11. The method of any one of the preceding embodiments, wherein generating for display the second recommendation based on the second output further comprises: selecting a first weight for the first category of known values; weighting the first output, based on the first weight, to generate a weighted first output; and averaging the weighted first output and the second output to determine the second recommendation.

12. The method of any one of the preceding embodiments, wherein the first category of known values corresponds to known slopes in the first dataset, wherein the first value corresponds to a known slope of the first datapoint, and wherein processing, using the first model, the first changepoint and the first value of the known values to determine the first output further comprises: comparing the first value to a threshold slope; and determining whether the first changepoint is the first false-positive changepoint based on comparing the first value to the threshold slope.

13. The method of any one of the preceding embodiments, wherein the first category of known values corresponds to known slopes in segments of the first dataset, wherein the first value corresponds to a known slope of a segment of the first dataset comprising the first datapoint, and wherein processing, using the first model, the first changepoint and the first value of the known values to determine the first output further comprises: determining a difference between the first value and a second value, wherein the second value corresponds to a slope of a consecutive segment in the first dataset; and determining whether the first changepoint is the first false-positive changepoint based on the difference.

14. The method of any one of the preceding embodiments, wherein determining whether the first changepoint is the first false-positive changepoint based on the difference further comprises: determining whether the consecutive segment comprises a second changepoint; and normalizing the difference based on whether the consecutive segment comprises a second changepoint.

15. One or more non-transitory, computer-readable mediums storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for improved precision in detecting false-positive changepoints in time-series data, the system comprising:
   one or more processors; and
   one or more non-transitory, computer-readable mediums comprising instructions that when executed by the one or more processors cause operations comprising:
      receiving a first dataset of time-series datapoints, wherein each datapoint in the time-series datapoints corresponds to a specific time stamp;
      generating for display, in a user interface, a first changepoint detected in the first dataset, wherein the first changepoint comprises a first datapoint in a first segment of the time-series datapoints that comprises a different data distribution than a second segment of the time-series datapoints;
      receiving, via the user interface, a first user input of a first category of known values for the first dataset;
      receiving, via the user interface, a second user input of a second category of the first changepoint;
      based on the first category and the second category, selecting a first model from a plurality of models for determining whether the first changepoint corresponds to a first false-positive changepoint, wherein each model of the plurality of models comprises a different algorithm for detecting false-positive changepoints;
      in response to selecting the first model, processing, using the first model, the first changepoint and a value of the known values to determine a first output; and
      generating for display, in a user interface, a first recommendation based on the first output, wherein the first recommendation indicates whether the first changepoint corresponds to the first false-positive changepoint.

2. A method for improved precision in detecting false-positive changepoints in time-series data, the method comprising:
   receiving a first dataset of time-series datapoints;

determining a first changepoint in the first dataset;
determining a first category of known values for the first dataset;
based on the first category of the known values, selecting a first model from a plurality of models for determining whether the first changepoint corresponds to a first false-positive changepoint;
in response to selecting the first model, processing, using the first model, the first changepoint and a first value of the known values to determine a first output; and
generating for display, in a user interface, a first recommendation based on the first output, wherein the first recommendation indicates whether the first changepoint corresponds to the first false-positive changepoint.

3. The method of claim 2, wherein the first category of known values corresponds to known changepoints, wherein the first value corresponds to an indication of whether a second datapoint is a known changepoint, and wherein processing, using the first model, the first changepoint and the first value of the known values to determine the first output further comprises:
determining whether the second datapoint in the time-series datapoints is the known changepoint; and
in response to determining that the second datapoint in the time-series datapoints is the known changepoint, determining whether the first changepoint and the second datapoint are consecutive datapoints in the time-series datapoints.

4. The method of claim 2, wherein the first category of known values corresponds to a known segment of the first dataset, wherein the first value corresponds to a known data distribution of the known segment, and wherein processing, using the first model, the first changepoint and the first value of the known values to determine the first output further comprises:
determining whether the known data distribution indicates that the known segment comprises a second changepoint; and
in response to determining whether the known data distribution indicates that the known segment comprises the second changepoint, determining whether a first segment comprising the first changepoint is consecutive with the known segment.

5. The method of claim 2, wherein processing, using the first model, the first changepoint and the first value of the known values to determine the first output further comprises:
determining consecutive changepoints in the first dataset;
filtering the consecutive changepoints from the first dataset; and
determining whether the first changepoint is the first false-positive changepoint based on whether the first changepoint is filtered from the first dataset.

6. The method of claim 2, wherein the first category of known values corresponds to a known model performance, wherein the first value corresponds to a model performance with the first changepoint, and wherein processing, using the first model, the first changepoint and the first value of the known values to determine the first output further comprises:
comparing the first value to a threshold value; and
determining whether the first changepoint is the first false-positive changepoint based on comparing the first value to the threshold value.

7. The method of claim 6, wherein comparing the model performance to the threshold value further comprises:

determining a second value, wherein the second value corresponds to the model performance without the first changepoint; and
determining the threshold value based on the second value.

8. The method of claim 2, wherein the first category of known values corresponds to known changes in value of model performance, wherein the first value corresponds to a known change in a model performance when the first changepoint is included, and wherein processing, using the first model, the first changepoint and the first value of the known values to determine the first output further comprises:
comparing the first value to a threshold model performance; and
determining whether the first changepoint is the first false-positive changepoint based on comparing the first value to the threshold model performance.

9. The method of claim 2, wherein processing, using the first model, the first changepoint and the first value of the known values to determine the first output further comprises:
generating a feature input based on the first changepoint and the first value; and
inputting the feature input into an artificial intelligence model to generate the first output, wherein the artificial intelligence model is trained on historic changepoints in historic datasets.

10. The method of claim 2, further comprising:
determining a second category of known values for the first dataset;
based on the second category of the known values, selecting a second model from the plurality of models for determining whether the first changepoint corresponds to the first false-positive changepoint;
in response to selecting the first model, processing, using the second model, the first changepoint and a second value of the known values to determine a second output; and
generating for display, in the user interface, a second recommendation based on the second output, wherein the second recommendation indicates whether the first changepoint corresponds to the first false-positive changepoint.

11. The method of claim 10, wherein generating for display the second recommendation based on the second output further comprises:
selecting a first weight for the first category of known values;
weighting the first output, based on the first weight, to generate a weighted first output; and
averaging the weighted first output and the second output to determine the second recommendation.

12. The method of claim 2, wherein the first category of known values corresponds to known slopes in the first dataset, wherein the first value corresponds to a known slope of the first changepoint, and wherein processing, using the first model, the first changepoint and the first value of the known values to determine the first output further comprises:
comparing the first value to a threshold slope; and
determining whether the first changepoint is the first false-positive changepoint based on comparing the first value to the threshold slope.

13. The method of claim 2, wherein the first category of known values corresponds to known slopes in segments of the first dataset, wherein the first value corresponds to a known slope of a segment of the first dataset comprising the first changepoint, and wherein processing, using the first model, the first changepoint and the first value of the known values to determine the first output further comprises:

determining a difference between the first value and a second value, wherein the second value corresponds to a slope of a consecutive segment in the first dataset; and     determining whether the first changepoint is the first false-positive changepoint based on the difference.

14. The method of claim 13, wherein determining whether the first changepoint is the first false-positive changepoint based on the difference further comprises:

determining whether the consecutive segment comprises a second changepoint; and     normalizing the difference based on whether the consecutive segment comprises a second changepoint.

15. One or more non-transitory, computer-readable mediums comprising instructions that when executed by one or more processors cause operations comprising:

receiving a first dataset of time-series datapoints, wherein each datapoint in the time-series datapoints corresponds to a specific time stamp, and wherein the first dataset comprises a first changepoint;

determining a first category of known values for the first dataset;

based on the first category of the known values, selecting a first model from a plurality of models for determining whether the first changepoint corresponds to a first false-positive changepoint;

in response to selecting the first model, processing, using the first model, the first changepoint and a first value of the known values to determine a first output; and     generating a first recommendation based on the first output, wherein the first recommendation indicates whether the first changepoint corresponds to the first false-positive changepoint.

16. The one or more non-transitory, computer-readable mediums of claim 15, wherein the first category of known values corresponds to known changepoints, wherein the first value corresponds to an indication of whether a second datapoint is a known changepoint, and wherein processing, using the first model, the first changepoint and the first value of the known values to determine the first output further comprises:

determining whether the second datapoint in the time-series datapoints is the known changepoint; and     in response to determining that the second datapoint in the time-series datapoints is the known changepoint, determining whether the first changepoint and the second datapoint are consecutive datapoints in the time-series datapoints.

17. The one or more non-transitory, computer-readable mediums of claim 15, wherein the first category of known values corresponds to known segment of the first dataset, wherein the first value corresponds to a known data distribution of the known segment, and wherein processing, using the first model, the first changepoint and the first value of the known values to determine the first output further comprises:

determining whether the known data distribution indicates that the known segment comprises a second changepoint; and     in response to determining whether the known data distribution indicates that the known segment comprises the second changepoint, determining whether a first segment comprising the first changepoint is consecutive with the known segment.

18. The one or more non-transitory, computer-readable mediums of claim 15, wherein processing, using the first model, the first changepoint and the first value of the known values to determine the first output further comprises:

determining consecutive changepoints in the first dataset;

filtering the consecutive changepoints from the first dataset; and     determining whether the first changepoint is the first false-positive changepoint based on whether the first changepoint is filtered from the first dataset.

19. The one or more non-transitory, computer-readable mediums of claim 15, wherein the first category of known values corresponds to known model performance, wherein the first value corresponds to a model performance with the first changepoint, and wherein processing, using the first model, the first changepoint and the first value of the known values to determine the first output further comprises:

comparing the first value to a threshold value; and determining whether the first changepoint is the first false-positive changepoint based on comparing the first value to the threshold value.

20. The one or more non-transitory, computer-readable mediums of claim 19, wherein comparing the first value to the threshold value further comprises:

determining a second value, wherein the second value corresponds to the model performance without the first changepoint; and     determining the threshold value based on the second value.

\* \* \* \* \*